Aug. 11, 1964　　　D. C. WELLS　　　3,143,813
MEANS FOR FELLING TREES
Filed Oct. 16, 1961　　　2 Sheets-Sheet 2
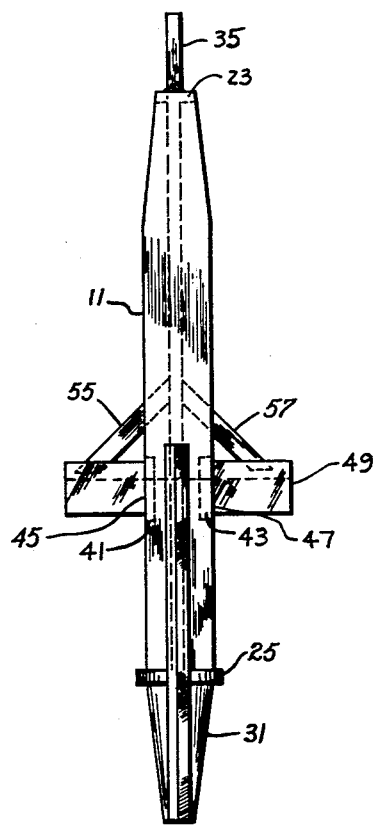
FIG. 7
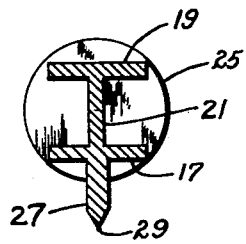
FIG. 4
FIG. 5
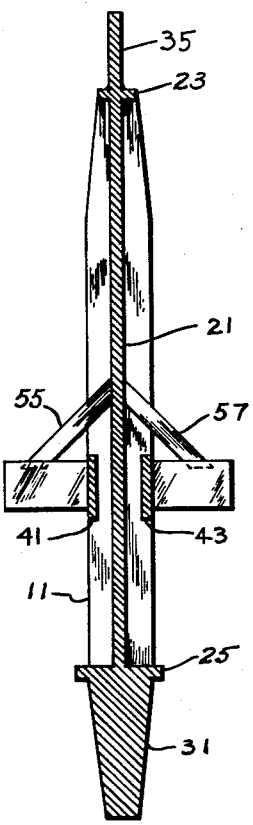
FIG. 6
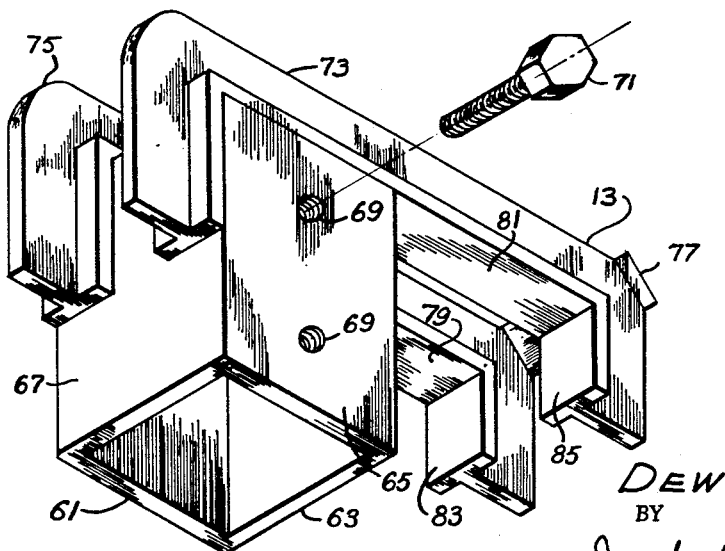
FIG. 8
INVENTOR.
DEWEY C. WELLS
BY
Joseph Alan Fenlon, Jr.
ATTORNEY

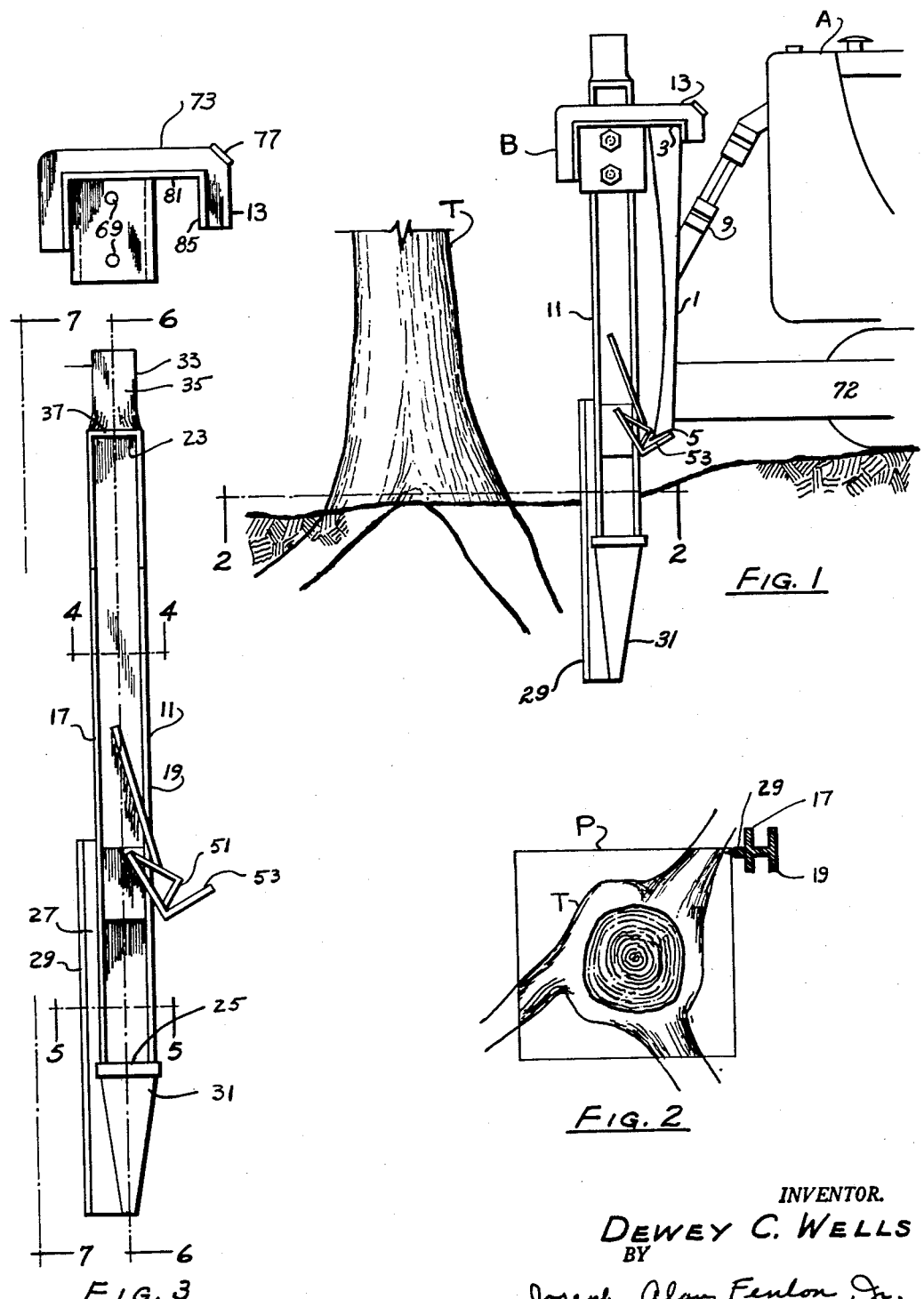

United States Patent Office 3,143,813
Patented Aug. 11, 1964

3,143,813
MEANS FOR FELLING TREES
Dewey C. Wells, R.R. 2, Perry, Mo.
Filed Oct. 16, 1961, Ser. No. 145,361
4 Claims. (Cl. 37—2)

This invention relates in general to means and methods for felling trees and in particular to a device suitable for secured attachment to a construction vehicle for purposes of cutting underground tree roots and the like.

It is the primary object of the present invention to provide a root cutting means which can be securely attached to the blade of a bulldozer and urged underground in the vicinity of a tree and thereupon used to dissociate the tree from its outwardly projecting roots for purposes of land clearing.

It is also an object of the present invention to provide a means of the class described for significantly reducing the time required to clear land.

It is a further object of the present invention to provide a method for accomplishing the purposes hereinbefore set forth.

With the above and other objects in view, my invention resides in the novel features of form, construction, arrangement, and combination of steps and parts presently described and pointed out in the claims.

In the accompanying drawings:

FIGURE 1 is a side elevational view of a bulldozer provided with an embodiment of the present invention as employed in the severing of tree roots;

FIGURE 2 is a fragmentary sectional view taken along lines 2—2 of FIGURE 1;

FIGURE 3 is an exploded side elevational view of the attachment comprising the present invention;

FIGURE 4 is a sectional view taken along lines 4—4 of FIGURE 3;

FIGURE 5 is a sectional view taken along lines 5—5 of FIGURE 3;

FIGURE 6 is a sectional view taken along lines 6—6 of FIGURE 3;

FIGURE 7 is a front elevational view of the cutting upright; and,

FIGURE 8 is an enlarged perspective view of the means for securing the upright to the construction vehicle.

Referring now in more detail and by reference character to the drawings, which illustrate a preferred embodiment of the present invention, A designates a construction vehicle, which is preferably, though not necessarily, a bulldozer having a blade 1 having an upper edge 3 and a lower edge 5 and which is conventionally connected to the vehicle A by means of an elongated arm 7 and an extendable hydraulic cylinder 9. In the conventional manner, the blade 1 may be vertically raised and lowered by the cylinder 9 as the vehicle is driven on treads.

Secured to the blade 1 of the vehicle A is a cutting attachment B comprising a lower member 11 and a removable upper mounting bracket 13. The member 11 includes an upright beam 15 having a pair of spaced parallel flanges 17, 19, interconnected by a web 21 (FIGS. 4 and 5), an upper end 23, and a lower end 25. Welded to the forward flange 17 near the lower end 25 of the beam 15 and projecting forwardly outwardly therefrom is a cutting blade 27 having elongated cutting edge 29 which extends downwardly past the lower end 25 of the beam 15. Welded to the flanges 17, 19, and the web 21 at the lower end 25 of the beam 15, and the cutting blade 27, is a solid supporting member 31 of substantially conical shape which decreases in cross-section progressively as it descends from the lower end 25 of the beam 15 to the lower edge of the cutting blade 27.

The upper portion 33 of the member 11 comprises a substantially rectangular element 35 formed by an extension 37 of the web 21 past the upper end 23 of the beam 15 and a gradual merger of the flanges 17, 19, into the extension 37 in the manner of guides. Intermediate the upper end 23 and the lower end 25 in substantial alignment with the upper part of the blade 27, the beam 15 is provided with a pair of filler plates 41, 43 (FIGS. 6 and 7), which are welded to opposing sides of the web 21 on the flanges 17, 19, and which form smooth, flat surfaces 45, 47, which include the outer edges of the flanges 17, 19, respectively, for purposes presently more fully appearing.

Welded to the member 11 at the surfaces 45, 47, and projecting laterally outwardly therefrom is a lower attachment bracket 49 having integrally joined complementary faces 51, 53 (FIGS. 1 and 3). Welded to the bracket 49 and the opposing faces of the web 21 and provided for retaining the bracket 49 in substantially perpendicular alignment with the elongated portion of the member 11 are a pair of struts 55, 57 (FIGS. 6 and 7).

The upper mounting bracket 13 includes an elongated rectangular channel 59, best shown in FIG. 8, having end walls 61, 63, 65, 67, the walls 61, 65 being parallel and spaced, and the walls 63, 67, also being parallel and spaced. It should be here noted that the spacing between the walls 61, 65, is such as to permit passage of the member 11 therebetween with the web 21 parallel to said walls. It should be also noted that the spacing between the walls 63, 67 is such as to permit passage of the web 21 therebetween with the web perpendicular to said walls, all for purposes presently more fully appearing.

The walls 61, 65, are each provided with vertically aligned threaded apertures 69 adapted for acceptance of bolts 71. Welded to the upper extremity of the channel 59 and projecting rearwardly outwardly therefrom in spaced parallel relation one to the other are U-shaped brackets 73, 75, and holding the brackets 73, 75, in such relation is a spacer bar 77, which is rigidly secured to each of said brackets. It should be noted the brackets 73, 75, are secured to the channel 59 in such manner as not to cause interference with the passage defined between the walls 61, 63, 65, 67.

In use, the cutting attachment B is attached to the bulldozer A with the cutting blade 27 being forwardly presented by urging the complementary faces 51, 53, of the lower attachment bracket 49 flushwise against the lower edge 5 of the blade 1, and simultaneously placing the upper mounting bracket 13 over the member 11 in such manner that the member 11 lies between the walls 61, 63, 65, 67. By urging the lower surfaces 79, 81, of the brackets 73, 75, against the upper edge 3 of the blade 1, and tightening the bolts 71 in the apertures 69 and against the web 21, the cutting attachment B may be securely fastened to the vehicle A in substantially vertical position. It should be here noted that the rear legs 83, 85, of the brackets 73, 75, respectively, are spaced from the wall 63 by a distance equal to the width of the upper edge of the blade 1, with some slight allowance for clearance, and, further, it should here also be noted that the contours of the faces 51, 53, and the U-shaped brackets 73, 75, are such that the cutting attachment B may be rigidly held against the blade 1.

When it is desired to fell a tree T for land clearing, the cutting attachment B is secured to the blade 1 in the manner previously described while blade 1 is in the elevated position on the vehicle A, whereupon the vehicle A may be driven to the vicinity of the tree T. Thereupon a root cutting path P (FIG. 2) is manually circumscribed about the tree T and the base of the attachment B is brought directly over one segment of the defined path P. The atachment B is then urged into the ground by forcibly lowering the blade 1 in the conventional manner, utilizing the cylinder 9. When the blade 27 has been submerged to a point such that the upper portion thereof is slightly above the surface of the local terrain, the vehicle A may be driven forwardly to urge the cutting edge 29 along the circumscribed path P. As the vehicle A moves forwardly, the edge 29 severs all of the underground tree roots with which it comes in contact. When the circumscribed path P has been completely traveled in this manner, the tree will have been effectively severed from its outwardly projecting roots, and the tree may then be toppled in the conventional manner (applying above-the-ground leverage to the tree T with the bulldozer) with substantially less difficulty.

It has been found that a bulldozer useing the attachment B in the manner previously described can do the work of a bulldozer approximately twice its size in substantially less than half the time.

It should be understod that changes and modifications in the form, construction, arrangement, and combination of the several parts and steps of the means for felling trees may be made and substituted for those herein shown and described without departing from the nature and principle of my invention.

Having thus described my invention, what I claim and desire to secure by Letters Patent is as follows:

1. For use with a construction vehicle having a vertically movable member, a root cutting attachment comprising an elongated vertically projecting beam, blade means secured to one end of said beam and projecting forwardly outwardly therefrom, supporting means secured to the blade and the lower end of the beam, said supporting means having the shape of a frustum of a cone with the smaller portion thereof being downwardly presented, and means for removably securing said beam to said member.

2. For use with a construction vehicle having a vertically movable member, a root cutting attachment comprising an elongated vertically projecting beam, blade means secured to one end of said beam and projecting forwardly outwardly therefrom, supporting means secured to the blade and the lower end of the beam, said supporting means having the shape of a frustum of a cone with the smaller portion thereof being downwardly presented and being substantially in horizontal alignment with the lower-most portion of said blade, and means for removably securing said beam to said member.

3. For use with a construction vehicle having a vertically moveable member, a root cutting attachment comprising an elongated vertically projecting beam, supporting means secured to the beam and projecting downwardly therefrom, said supporting means having the shape of a frustum of a cone with the smaller portion thereof being downwardly presented, an elongated blade secured to the beam and the supporting means and projecting forwardly outwardly therefrom along its entire length, and means for removably securing the beam to the member.

4. The device of claim 3 in which the beam and the supporting means arealigned along the forward edges thereof, and the blade edge is parallel thereto.

References Cited in the file of this patent

UNITED STATES PATENTS

| | | |
|---|---|---|
| 637,624 | Nelson | May 7, 1901 |
| 1,146,468 | Williams | July 13, 1915 |
| 1,295,364 | Peterson | Feb. 25, 1919 |
| 1,391,131 | Lynch et al. | Sept. 20, 1921 |
| 1,735,998 | Elkin | Nov. 19, 1929 |
| 2,474,037 | Cuthrell | June 21, 1949 |
| 2,615,262 | Reid | Oct. 28, 1952 |
| 2,718,075 | MacLeod et al. | Sept. 20, 1955 |
| 2,821,796 | Forte | Feb. 4, 1958 |
| 2,852,875 | Bierwith et al. | Sept. 23, 1958 |
| 2,860,426 | Allin et al. | Nov. 18, 1958 |
| 2,882,622 | Howard | Apr. 21, 1959 |

FOREIGN PATENTS

| | | |
|---|---|---|
| 216,774 | Germany | Dec. 3, 1909 |